United States Patent
Kitchen et al.

(10) Patent No.: US 8,496,088 B2
(45) Date of Patent: *Jul. 30, 2013

(54) ACOUSTIC COMPOSITE

(75) Inventors: Dale S. Kitchen, Boiling Springs, SC (US); Pradipkumar Bahukudumbi, Greenville, SC (US); Gregory Thompson, Simpsonville, SC (US); Mark T. Mapes, Pelzer, SC (US)

(73) Assignee: Milliken & Company, Spartanburg, SC (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/292,660

(22) Filed: Nov. 9, 2011

(65) Prior Publication Data

US 2013/0112499 A1    May 9, 2013

(51) Int. Cl.
- *E04B 1/84* (2006.01)
- *E04B 1/82* (2006.01)
- *G10K 11/168* (2006.01)
- *B32B 7/02* (2006.01)
- *E04B 1/74* (2006.01)
- *G10K 11/16* (2006.01)
- *B32B 7/00* (2006.01)

(52) U.S. Cl.
USPC ........... 181/290; 181/294; 181/296; 428/216; 428/218; 442/278; 442/411

(58) Field of Classification Search
USPC ............... 181/290, 294, 286, 291, 284, 296, 181/204, 205; 428/216, 218; 442/278, 411, 442/414, 415
See application file for complete search history.

(56) References Cited

U.S. PATENT DOCUMENTS

| | | | |
|---|---|---|---|
| 570,746 A | 11/1896 | Curtis et al. | |
| 3,016,599 A | 1/1962 | Perry, Jr. | |
| 3,546,063 A | 12/1970 | Breen | |
| 3,669,823 A * | 6/1972 | Wood | 442/333 |
| 4,042,740 A | 8/1977 | Krueger | 428/138 |
| 4,100,324 A | 7/1978 | Anderson et al. | 428/288 |
| 4,118,531 A | 10/1978 | Hauser | 428/224 |
| 4,363,646 A | 12/1982 | Torobin | 65/5 |
| 4,415,512 A | 11/1983 | Torobin | 264/9 |
| 4,525,314 A | 6/1985 | Torobin | 264/9 |
| 4,536,361 A | 8/1985 | Torobin | 264/167 |
| 4,568,581 A | 2/1986 | Peoples, Jr. | 428/35 |
| 4,840,832 A | 6/1989 | Weinle et al. | 428/156 |
| 4,910,064 A | 3/1990 | Sabee | 428/113 |
| 4,931,355 A | 6/1990 | Radwanski et al. | 428/283 |
| 5,075,161 A | 12/1991 | Nyssen et al. | 428/288 |
| 5,114,631 A | 5/1992 | Nyssen et al. | 264/6 |
| 5,260,003 A | 11/1993 | Nyssen et al. | 264/6 |

(Continued)

FOREIGN PATENT DOCUMENTS

| WO | WO 2006/108363 | 10/2006 |
|---|---|---|
| WO | WO 2009/085679 | 7/2009 |

*Primary Examiner* — Edgardo San Martin
(74) *Attorney, Agent, or Firm* — Cheryl J. Brickey

(57) ABSTRACT

An acoustic composite containing at least a first acoustically coupled non-woven composite and a second acoustically coupled non-woven composite, each acoustically coupled non-woven composite containing a non-woven layer and a facing layer. The non-woven layer contains a plurality of binder fibers and a plurality of bulking fibers and has a binder zone and a bulking zone. The facing layer of the second acoustically coupled non-woven composite is adjacent the second surface of the non-woven layer of the first acoustically coupled non-woven composite.

20 Claims, 5 Drawing Sheets

U.S. PATENT DOCUMENTS

| | | | | |
|---|---|---|---|---|
| 5,298,694 | A | 3/1994 | Thompson et al. | 181/286 |
| 5,503,782 | A | 4/1996 | Dyrud et al. | 264/6 |
| 5,582,907 | A | 12/1996 | Pall | 428/287 |
| 5,591,335 | A | 1/1997 | Barboza et al. | 210/323.2 |
| 5,607,491 | A | 3/1997 | Jackson et al. | 55/528 |
| 5,652,048 | A | 7/1997 | Haynes et al. | 442/351 |
| 5,679,379 | A | 10/1997 | Fabbricante et al. | 425/7 |
| 5,681,469 | A | 10/1997 | Barboza et al. | 210/503 |
| 5,685,757 | A | 11/1997 | Kirsch et al. | 442/344 |
| 5,733,581 | A | 3/1998 | Barboza et al. | 425/72.2 |
| 5,773,375 | A | 6/1998 | Swan et al. | 442/340 |
| 5,783,011 | A | 7/1998 | Barboza et al. | 156/167 |
| 5,993,943 | A | 11/1999 | Bodaghi et al. | 428/198 |
| 6,057,256 | A | 5/2000 | Krueger et al. | 442/400 |
| 6,114,017 | A | 9/2000 | Fabbricante et al. | 428/198 |
| 6,120,939 | A | 9/2000 | Whear et al. | 429/254 |
| 6,183,670 | B1 | 2/2001 | Torobin et al. | 264/6 |
| 6,269,513 | B1 | 8/2001 | Torobin | 15/104.93 |
| 6,315,806 | B1 | 11/2001 | Torobin et al. | 55/522 |
| 6,382,526 | B1 | 5/2002 | Reneker et al. | 239/294 |
| 6,395,046 | B1 | 5/2002 | Emig et al. | 55/382 |
| 6,520,425 | B1 | 2/2003 | Reneker | 239/294 |
| 6,524,514 | B1 | 2/2003 | Volokitin et al. | 264/403 |
| 6,554,881 | B1 | 4/2003 | Healey | 55/528 |
| 6,623,548 | B1 | 9/2003 | Gordon et al. | 96/15 |
| 6,655,394 | B1 | 12/2003 | Tanaka et al. | 134/22.18 |
| 6,692,868 | B2 | 2/2004 | Zucker | 429/144 |
| 6,695,992 | B2 | 2/2004 | Reneker | 264/29.1 |
| 6,743,273 | B2 | 6/2004 | Chung et al. | 55/482 |
| 6,752,609 | B2 | 6/2004 | Volokitin et al. | 425/8 |
| 6,800,226 | B1 | 10/2004 | Gerking | 264/40.3 |
| 6,827,764 | B2 | 12/2004 | Springett et al. | 96/66 |
| 6,858,057 | B2 | 2/2005 | Healey | 55/528 |
| 6,893,711 | B2 | 5/2005 | Williamson et al. | 428/297.1 |
| 6,966,939 | B2 | 11/2005 | Rammig et al. | 55/486 |
| 7,112,389 | B1 | 9/2006 | Arora et al. | 429/128 |
| 7,153,794 | B2 * | 12/2006 | Wenstrup et al. | 442/415 |
| 7,214,444 | B2 | 5/2007 | Zucker | 429/144 |
| 7,226,656 | B2 | 6/2007 | Coates et al. | 428/221 |
| 7,229,938 | B2 * | 6/2007 | Wenstrup et al. | 442/415 |
| 7,326,663 | B2 | 2/2008 | Sodemann et al. | 442/401 |
| 7,341,963 | B2 * | 3/2008 | Wenstrup et al. | 442/415 |
| 7,390,760 | B1 | 6/2008 | Chen et al. | 442/341 |
| 7,426,776 | B2 | 9/2008 | Love, III et al. | 28/167 |
| 7,428,803 | B2 * | 9/2008 | Wenstrup et al. | 52/506.07 |
| 7,446,065 | B2 * | 11/2008 | Wenstrup et al. | 442/415 |
| 7,454,817 | B2 * | 11/2008 | Wenstrup et al. | 19/302 |
| 7,476,632 | B2 | 1/2009 | Olson et al. | 442/411 |
| 7,501,085 | B2 | 3/2009 | Bodaghi et al. | 264/115 |
| 7,521,386 | B2 * | 4/2009 | Wenstrup et al. | 442/389 |
| 7,530,147 | B2 | 5/2009 | Noelle et al. | 19/299 |
| 7,605,097 | B2 * | 10/2009 | Thompson et al. | 442/408 |
| 7,618,702 | B2 | 11/2009 | Frey et al. | 428/297.4 |
| 7,651,964 | B2 * | 1/2010 | Thompson et al. | 442/361 |
| 7,696,112 | B2 * | 4/2010 | Wenstrup et al. | 442/415 |
| 7,709,405 | B2 | 5/2010 | Wenstrup et al. | 442/415 |
| 7,757,811 | B2 | 7/2010 | Fox et al. | 181/291 |
| 7,776,251 | B2 | 8/2010 | Griffin et al. | 264/518 |
| 7,807,591 | B2 | 10/2010 | Fox et al. | 442/344 |
| 7,825,050 | B2 * | 11/2010 | Wilfong et al. | 442/381 |
| 7,863,206 | B2 | 1/2011 | Harrington et al. | 442/329 |
| 7,914,635 | B2 * | 3/2011 | Thompson et al. | 156/62.2 |
| 8,322,487 | B1 * | 12/2012 | Kitchen et al. | 181/294 |
| 2004/0043685 | A1 | 3/2004 | Goldwasser et al. | 442/61 |
| 2004/0206377 | A1 | 10/2004 | Griffin et al. | 134/56 D |
| 2005/0067732 | A1 | 3/2005 | Kim et al. | 264/172.19 |
| 2006/0012084 | A1 | 1/2006 | Armantrout et al. | 264/465 |
| 2006/0094320 | A1 | 5/2006 | Chen et al. | 442/340 |
| 2006/0097431 | A1 | 5/2006 | Hovanec | 264/465 |
| 2006/0290031 | A1 | 12/2006 | Jirsak et al. | 264/465 |
| 2007/0254545 | A1 | 11/2007 | Martin | 442/328 |
| 2008/0017038 | A1 | 1/2008 | Wu | 96/154 |
| 2008/0023888 | A1 | 1/2008 | Brang et al. | 264/555 |
| 2008/0026661 | A1 | 1/2008 | Fox et al. | 442/344 |
| 2008/0093778 | A1 | 4/2008 | Johnson et al. | 264/465 |
| 2008/0131615 | A1 | 6/2008 | Robertson et al. | 427/483 |
| 2008/0153375 | A1 * | 6/2008 | Wilfong et al. | 442/415 |
| 2008/0173497 | A1 | 7/2008 | Kalinova et al. | 181/290 |
| 2008/0202078 | A1 | 8/2008 | Healey et al. | 55/341.1 |
| 2008/0230309 | A1 | 9/2008 | Fox et al. | 181/286 |
| 2008/0242171 | A1 | 10/2008 | Huang et al. | 442/51 |
| 2008/0315454 | A1 | 12/2008 | Angadjivand et al. | 264/211.12 |
| 2008/0318024 | A1 | 12/2008 | Angadjivand et al. | 428/311.51 |
| 2009/0039564 | A1 | 2/2009 | Krause et al. | 264/514 |
| 2009/0159860 | A1 * | 6/2009 | Wenstrup et al. | 252/608 |
| 2010/0112881 | A1 * | 5/2010 | Bahukudumbi | 442/1 |
| 2010/0175362 | A1 | 7/2010 | Stranska et al. | 57/402 |
| 2010/0233458 | A1 | 9/2010 | Sun et al. | 428/292.1 |
| 2010/0304108 | A1 | 12/2010 | Doshi et al. | 428/219 |
| 2011/0139543 | A1 * | 6/2011 | Coates et al. | 181/290 |

* cited by examiner

ACOUSTIC COMPOSITE

FIELD OF THE INVENTION

The present invention generally relates to composites having acoustical absorbance properties and methods of making and using such composites.

BACKGROUND

There are a number of products in various industries, including automotive, office and home furnishings, construction, and others; that require materials having a z-direction thickness to provide thermal, sound insulation, aesthetic, and other performance features. In many of these applications it is also required that the material be thermoformable to a specified shape and rigidity. In the automotive industry these products often are used for shielding applications such as noise and thermal barriers in automotive hood liners and firewall barriers. These automotive materials may or may not have an aesthetic cover material incorporated into the part, which can also protect the core from abrasion, etc. In home and office furnishing, and construction applications these materials are often used as structural elements to which exterior decorative materials might be added.

There is a need for an acoustic non-woven composite having reduced weight, improved acoustic properties, and lower materials and manufacturing costs.

BRIEF SUMMARY

The present disclosure generally relates to an acoustic composite containing at least a first acoustically coupled non-woven composite and a second acoustically coupled non-woven composite, each acoustically coupled non-woven composite containing a non-woven layer and a facing layer. The non-woven layer contains a plurality of binder fibers and a plurality of bulking fibers and has a binder zone and a bulking zone. The facing layer of the second acoustically coupled non-woven composite is adjacent the second surface of the non-woven layer of the first acoustically coupled non-woven composite. The method of making the acoustic composite and uses are also disclosed.

DETAILED DESCRIPTION

The present disclosure is directed to acoustic composites that provide acoustical properties including, but not limited to, sound absorption properties, and sound barrier properties. The acoustic composite (and the acoustically coupled non-woven composites within the acoustic composite) have exceptional sound absorption properties; (2) have structural features that enable their use in a variety of applications; and (3) can be manufactured in a cost-effective manner.

In practice, roll-goods of a single layer of acoustically-coupled nonwovens can be made in a single process. The roll-goods can be supplied to a die-cutting operation to make individual acoustic parts, such as for installation in an automobile. At the cutting stage two or more layers can be rolled out simultaneously and cut together to form a single acoustic composite consisting of two or more coupled non-woven composites.

In one embodiment, multiple acoustically coupled non-woven composites 10 may be stacked to form a multi-composite structure. Typically, the second side of a non-woven layer will be adjacent the facing layer of the adjacent composite forming a composite with a pattern of non-woven layer, facing layer, non-woven layer, facing layer, etc. Different non-woven layers and composites may have better sound absorption at different frequencies so multiple composites may be stacked in order to form a composite which would absorb sound over a broader frequency range. In one embodiment, the composites are stacked and are not adhered in any way. In another embodiment, the composites are attached by any known means including grommets, staples, stitching, ultrasonic welding, point bonding, and adhesives (sprayed, extruded, coated, fibers, or any other means). In another embodiment, the composite is formed such that a second binder fiber is located in a high concentration on the second surface of the non-woven layer and these second binder fibers will melt and bond with the facing layer of the adjacent composite. This will form a multi-composite structure where the entire structure is acoustically coupled.

Figure 1:
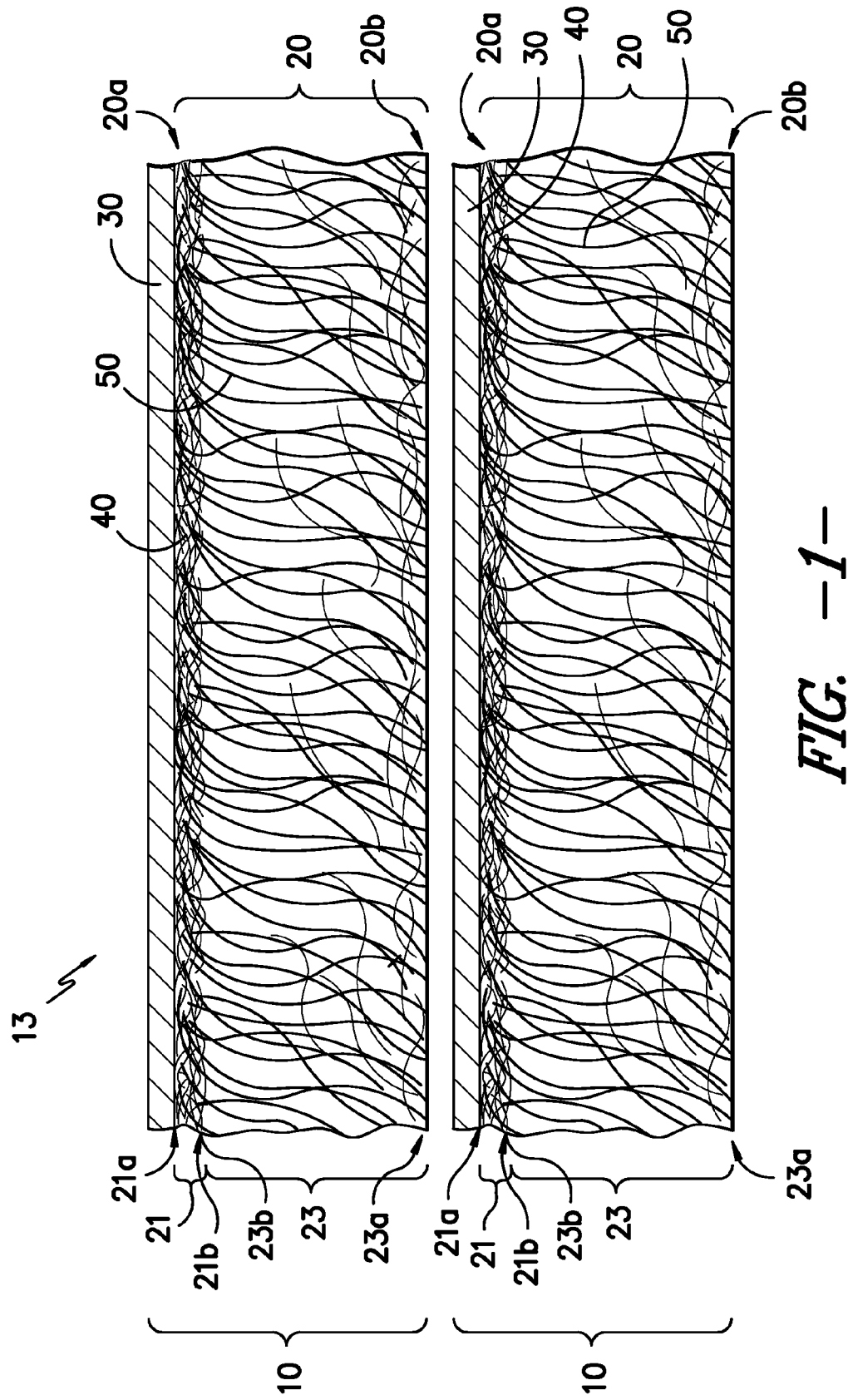
FIGS. 1-3 illustrate schematically cross-sections of embodiments of the acoustic composite.
Figure 2:
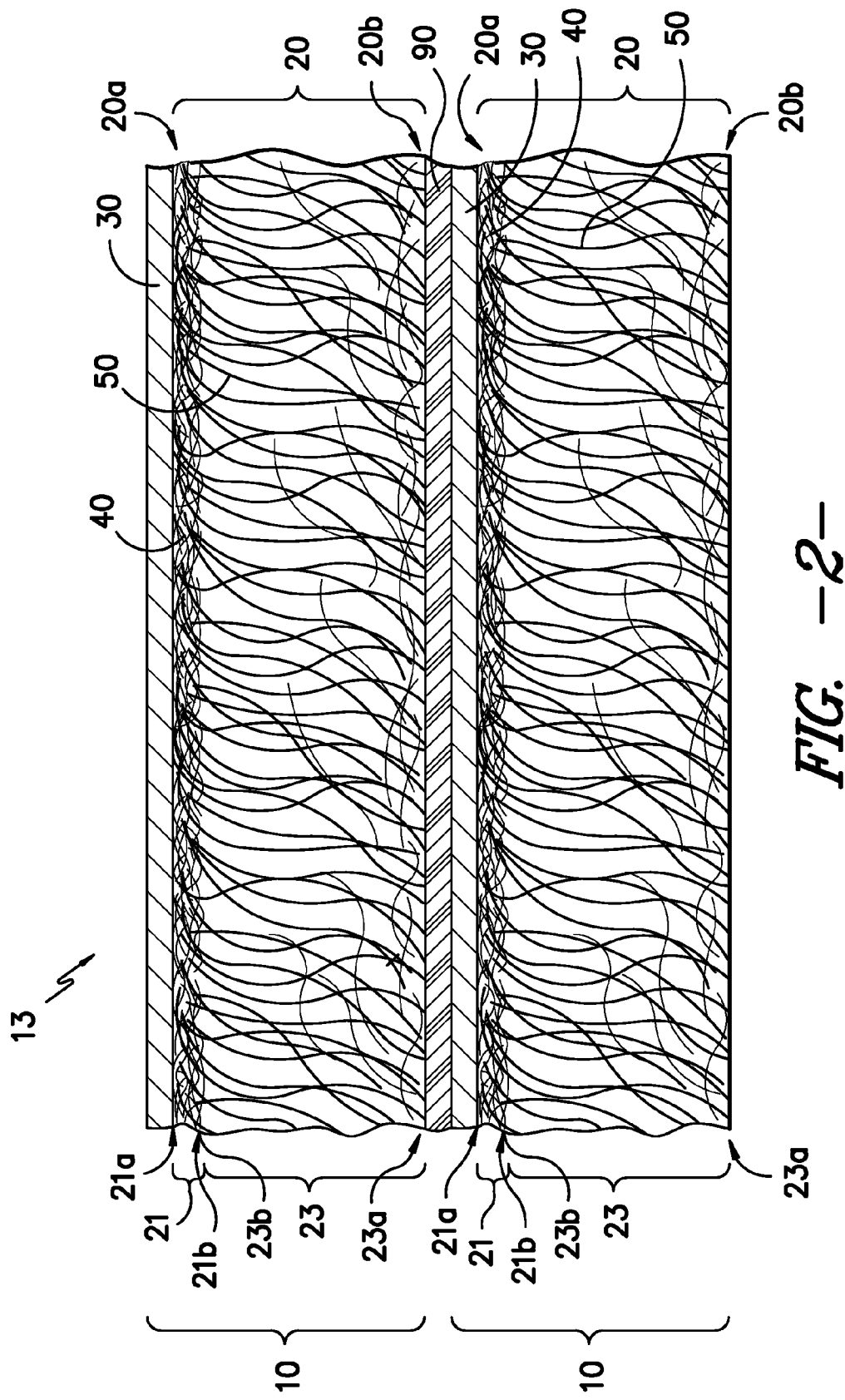
Figure 3:
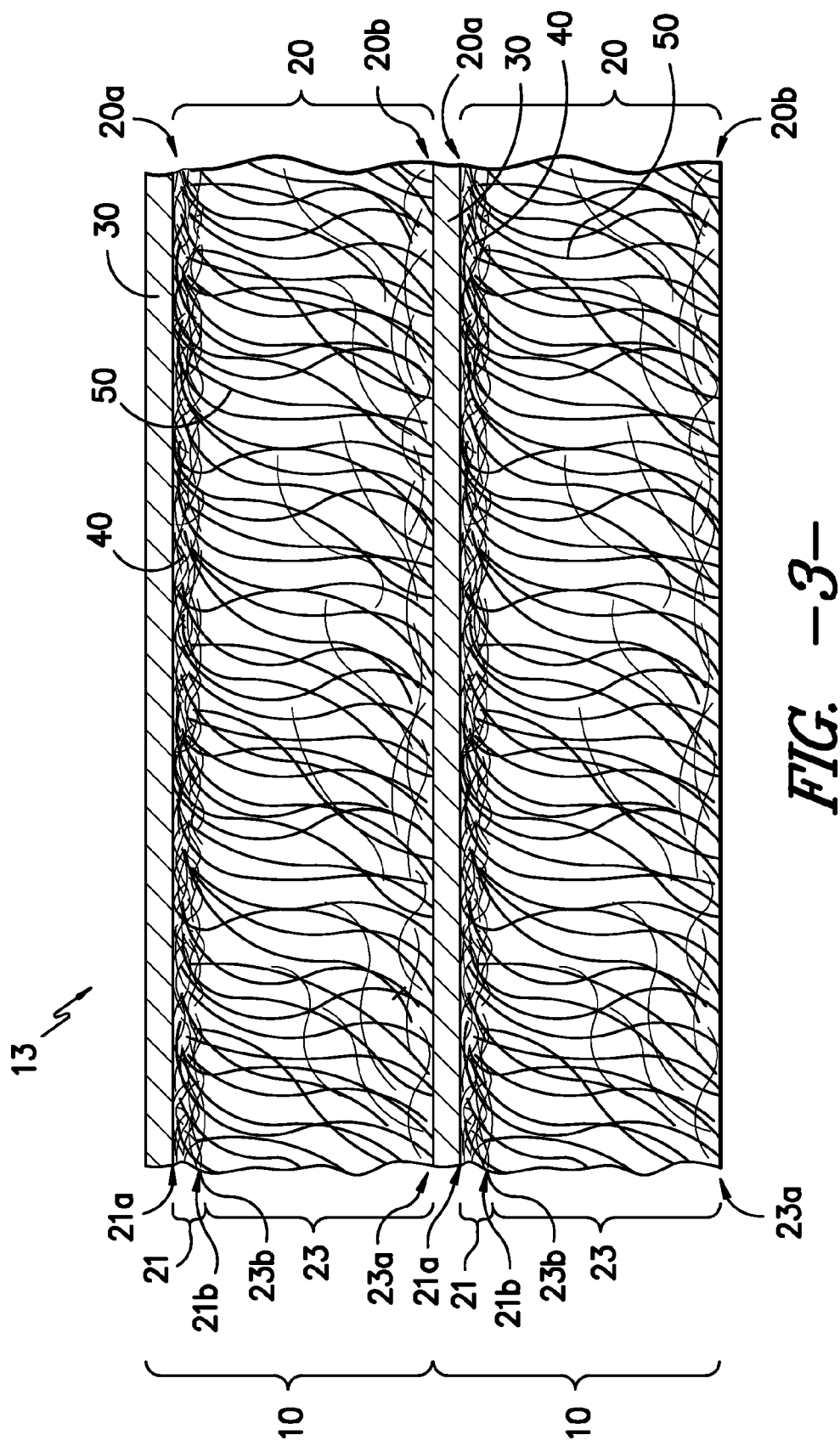

Referring now to FIG. 1, there is shown a cross-section of one embodiment of the acoustic composite 13. The acoustic composite 13 contains at least two acoustically coupled non-woven composites 10 (a first acoustically coupled non-woven composite shown as the composite on the top of the acoustic composite and a second acoustically coupled non-woven composite shown as at the bottom of the acoustic composite). Each acoustically coupled non-woven composite 10 contains a non-woven layer 20 and a facing layer 30. The non-woven layer 20 contains a first surface 20a and a second surface 20b and has a plurality of binder fibers 40 and bulking fibers 50. The non-woven layer 20 also contains a binder zone 21 and a bulking zone 23. While FIGS. 1-3 illustrate embodiments where the acoustic composite 13 contains two acoustically coupled non-woven composites 10, the acoustic composite may contain any suitable number of acoustically coupled non-woven composites 10 including one, two, three, four, five, six, or more.

In FIG. 1, the two acoustically coupled non-woven composites 10 are not connected in anyway and there may be a small air gap between them. In FIG. 2, the two acoustically coupled non-woven composites 10 are connected by an adhesive layer 90. In FIG. 3, the two acoustically coupled non-woven composites 10 are connected through the binder fibers 40 of the non-woven layer 20 without use of any additional adhesives.

The non-woven layer 20 is a unitary material, and the boundaries of the two zones (21, 23) do not represent the delineation of layers, but rather areas within the unitary material. Because the non-woven layer 20 is a unitary material, and the binder zone 21 and the bulking zone 23 are not discrete separate layers joined together, at least some of each type of fiber within the non-woven layer 20 will occur in each zone. Although FIG. 1 illustrates the binder zone 21 as being a smaller thickness in the z-direction (z-direction is the direction perpendicular to the plane formed by the first or section surface of the non-woven layer 20) than the bulking zone 23, the relative thickness of the two zones can be different than as shown. The non-woven layers 20 within the acoustic composite may all be the same layers or may vary from one another in thickness, weight, materials, and additives.

The non-woven composite 10 is acoustically coupled meaning that the facing layer is mechanically coupled to the binder fibers through a plurality of fiber bond sites. The binder fibers 40 are bonded together to create a cohesive two-dimensional fiber network which anchors the bulking fibers 50. This mechanical coupling between the bulking fibers 50 and the binder fibers 40 and between the binder fibers 40 and the materials of the facing layer 30 provides a continuous acoustic pathway for effective sound absorption. The plurality of binder fibers 40 coupling to the material of the facing layer 30 creates a broad frequency acoustic resonator. Introduction of additional adhesive layers to bond the thermoplastic film to the non-woven layer may compromise this coupling and decrease broad frequency sound absorption in the case where the facing layer is a film.

The binder fibers 40 of the non-woven layers 20 are fibers that form an adhesion or bond with the other fibers. Binder fibers 40 can include fibers that are heat activated. Examples of heat activated binder fibers are fibers that can melt at lower temperatures, such as low melt fibers, bi-component fibers, such as side-by-side or core and sheath fibers with a lower sheath melting temperature, and the like. In one embodiment, the binder fibers 40 are a polyester core and sheath fiber with a lower melt temperature sheath. A benefit of using a heat activated binder fiber as the binder fiber 40 in the non-woven layer 20, is that the layer can be subsequently molded to part shapes for use in automotive hood liners, engine compartment covers, ceiling tiles, office panels, etc. The binder fibers are preferably staple fibers. Preferably, when the non-woven composite 10 is consolidated and then cooled, the binder fibers 40 remain as discernable fibers. In another embodiment, when the non-woven composite 10 is consolidated, the binder fibers 40 lose their fiber shape and form a coating on surrounding materials (the film 30 or bulking fibers 50).

In one embodiment, the binder fibers 40 are in an amount of less than about 60% wt of the whole non-woven layer 20. In another embodiment, the binder fibers 40 are in an amount of less than about 50% wt of the whole non-woven layer 20. In another embodiment, the binder fibers 40 are in an amount of less than about 40% wt of the whole non-woven layer 20. Preferably, the binder fibers 40 have a denier less than or about equal to 15 denier, more preferably less than about 6 denier. An additional benefit of using a heat activated binder fiber as the binder fiber 40 is that the non-woven composite 10 may be subsequently molded to part shapes for use in automotive hood liners, engine compartment covers, etc. In one embodiment, at least some of the binder fibers 40 are nanofibers (their diameter is less than one micrometer).

The bulking fibers 50 of the non-woven layer 20 are fibers that provide volume in the z-direction of the non-woven layer, which extends perpendicularly from the planar dimension of the non-woven layer 20. Types of bulking fibers would include (but are not limited to) fibers with high denier per filament (5 denier per filament or larger), high crimp fibers, hollow-fill fibers, and the like. These fibers provide mass and volume to the material. Some examples of bulking fibers 50 include polyester, polypropylene, and cotton, as well as other low cost fibers. Preferably, the bulking fibers 50 have a denier greater than about 12 denier. In another embodiment, the bulking fibers 50 have a denier greater than about 15 denier. The bulking fibers are preferably staple fibers. In one embodiment, the bulking fibers do not a circular cross section, but are fibers having a higher surface area, including but not limited to, segmented pie, 4DG, winged fibers, tri-lobal etc. It has been shown that the fiber cross-section has an effect on the sound absorption properties of the nonwoven.

Any other suitable fiber may also be used in the non-woven layer 20 in addition to the bulking fibers 50 and the binder fibers 40. These may include, but are not limited to a second binder fiber having a different denier, staple length, composition, or melting point, a second bulking fiber having a different denier, staple length, or composition, and a fire resistant or fire retardant fiber. The fiber may also be an effect fiber, providing benefit a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), or others. Where the additional fibers reside in the non-woven composite 10 (in the binder zone 21 or the bulking zone 23) depends on their weight per unit length and other parameters. For example, if the additional fiber has a denier similar to that of the binder fiber, a larger percentage of the additional fiber will be in the binder zone. More information about stratified non-wovens containing multiple fibers may be found in U.S. Pat. No. 7,709,405 issued May 4, 2010, U.S. Pat. No. 7,696,112 issued Apr. 13, 2010, U.S. Pat. No. 7,605,097 issued Oct. 20, 2009, U.S. Pat. No. 7,651,964 issued Jan. 26, 2010, U.S. Pat. No. 7,341,963 issued Mar. 11, 2008, and U.S. Pat. No. 7,229,938 issued Jun. 12, 2007, all of which are herein incorporated by reference.

In one embodiment, the non-woven layer 20 contains fire resistant fibers. These fire resistant fibers may also act as the bulking fibers or may be sued in addition to the bulking fibers. As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

The fibers (binder fibers 40, bulking fibers 50, and any other fiber in the acoustic composite 13) may additionally contain additives. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

Referring back to FIG. 1, the non-woven layer 20 contains a binder zone 21 and a bulking zone 23. The binder zone 21 has a binder outer boundary 21a located at the first surface 20a of the non-woven layer 20, and a binder inner boundary 21b located near the bulking zone 23. The bulking zone has an bulking outer boundary 23a located at the second surface 20b of the non-woven layer 20 and a bulking inner boundary 23b near the binder zone 21. The binder inner boundary 21b and the bulking inner boundary 23b are at the same location. The non-woven layer 20 is a unitary material, and the boundaries of the two zones (21, 23) do not represent the delineation of layers, but rather areas within the unitary material. These "zones" may also be referred to as region or areas.

The boundary between the two zones (the binder zone 21 and bulking zone 23) is located at the binder inner boundary 21b and the bulking inner boundary 23b. This boundary, in one embodiment, is defined to be the location where the percent by weight of the binder fibers 40 and the bulking fibers 50 are approximately equal. In this embodiment, the binder zone 21 contains a greater percentage by weight of the binder fibers 40 than the bulking fibers 50 and the bulking zone 23 contains a greater percentage by weight of the bulking fibers 50 than the binder fibers 40. In another embodiment, the boundary between the binder zone and the bulking zone is at the transition where the majority of fibers have an angle of between 0 and 20 degrees to the binder (or bulking) outer boundary to where the majority of fibers have an angle of between 25 and 90 degrees to the binder (or bulking) outer boundary.

The binder zone 21 contains both binder fibers 40 and bulking fibers 50 (and some of any other type of fiber used in the non-woven layer 20). The binder zone contains a higher concentration and a higher percentage by weight of binder fibers 40 than bulking fibers 50. The concentration of binder fibers 40 is the greatest at the binder outer boundary 21a and decreases in a gradient to the binder inner boundary 21b and the second surface 20b of the non-woven layer 20.

In one embodiment of the non-woven layer, the section of the binder zone within 3 mm of the binder outer boundary 21a preferably contains a greater percentage by weight of binder fibers than the percentage by weight of binder fibers in the whole non-woven layer 20. Preferably, the section of the binder zone within 3 mm of the binder outer boundary 21a preferably contains at least about 60% wt binder fiber. In another embodiment, the section of the binder zone 21 within 3 mm of the binder outer boundary 21a preferably contains at least about 75% wt, at least about 80% wt, at least about 85% wt, at least about 90% wt, or at least about 95% wt binder fiber 40. In another embodiment, the section of the binder zone 21 within 3 mm of the binder outer boundary 21a preferably contains at least about 20% wt more binder fiber as compared to the percentage by weight of binder fiber 40 in the whole non-woven layer 20.

In another embodiment, the section of the non-woven layer from the binder outer zone to a plane which is 25% of the total thickness of the non-woven layer away from the binder outer zone contains a greater percentage by weight of binder fibers than the percentage by weight of binder fibers in the whole non-woven layer 20. In another embodiment, this section of the non-woven layer preferably contains at least about 60% wt binder fiber. In another embodiment, this section of the non-woven layer preferably contains at least about 75% wt, at least about 80% wt, at least about 85% wt, at least about 90% wt, or at least about 95% wt binder fiber 40. In another embodiment, this section of the non-woven layer preferably contains at least about 20% wt more binder fiber as compared to the percentage by weight of binder fiber 40 in the whole non-woven layer 20.

A majority (at least 50% wt) of the binder fibers 40 in the binder zone 21 are preferably oriented approximately parallel to the binder outer boundary 21a. For this application, "oriented approximately parallel" means that the angle formed between the fiber and the plane of the binder outer boundary 21a surface is between 0 and 20 degrees. In another embodiment, at least about 55% wt, at least about 60% wt, and at least about 75% wt of the binder fibers 40 are oriented approximately parallel to the binder outer boundary 21a. Preferably, the majority of the length of the fiber is oriented approximately parallel to the binder outer boundary. In one embodiment, at least 50%, 60, or 80% of the length of at least 50% of the binder fibers (by number) are oriented approximately parallel to the binder outer boundary. This maximizes the potential bonding area between the binder fibers and the facing layer 30.

The binder fibers 40 are preferably randomly oriented in the x and y direction, the x and y direction being in the plane parallel to the binder outer boundary 21a. This means that there is little to no orientation of the binder fiber 40 in the machine or cross-machine direction. The random orientation in the plane maximizes the available bonding sites between the facing layer 30 and binder fibers 40 within the non-woven layer 20.

If the binder fibers 40 had substantial z-direction orientation, less fiber surface area would be in direct contact with the facing layer 30, thereby compromising bonding and reducing acoustic coupling. In addition, fiber blends can be chosen to optimize the spacing and number of discrete bonding sites to maximize the acoustic coupling between the facing layer 30 and non-woven layer 20. In addition, the planar concentration of binder fibers 40 provides an anchoring plane for the z-oriented bulking fibers 50, and creating a unitary, mechanically and acoustically coupled non-woven composite 10. So therefore a higher concentration of binder fibers with a random x-y orientation is preferred.

The bulking zone 23 contains both binder fibers 40 and bulking fibers 50 (and some of any other type of fiber used in the non-woven layer 20). The bulking zone 23 contains a higher concentration and a high percentage by weight of bulking fibers 50 than binder fibers 50. The concentration of bulking fibers 50 is the greatest at the bulking outer boundary 23a (which is also the second surface 20b of the non-woven layer 20) and decreases in a gradient to the bulking inner boundary 23b and the first surface 20a of the non-woven layer 20.

The bulking fibers 50 in the bulking zone 23 preferably are oriented generally in the z-direction (the z-direction is defined as the direction perpendicular to the plane formed by the bulking outer boundary. The z-orientation of the bulking fibers 50 allows for increased thickness of the non-woven layer 20. Z-orientation allows for higher compression resistance and retention of loft during handling. The increased thickness of the non-woven layer 20 also provides improved sound absorption, particularly at lower frequencies. Preferably, a majority of the bulking fibers 50 have a tangential angle of between about 25 and 90 degrees to the normal of the bulking outer boundary 23a measured at the midpoint between the bulking outer boundary 23a and bulking inner boundary 23b. This means that if a tangent was drawn on the bulking fibers 50 at the midpoint between the bulking outer boundary 23a and the bulking inner boundary 23b, the angle formed by the tangent and the plane formed by the bulking outer boundary 23a would be between about 90 degrees and 25 degrees. More preferably, the angle formed by the tangent and the plane formed by the bulking outer boundary 23a would be between about 90 degrees and 45 degrees. Preferably, the bulking fibers 50 are not bonded directly to each other, but bulking fibers 50 are bonded to other bulking fibers 50 (and other fibers or layers) through binder fibers 40.

The binder fibers 40 are adhered to the bulking fibers 50 in order to acoustically couple the entire composite 10. The bulking fibers are entangled and bonded at the bonding interface with the binding fibers. The bonding between individual bulking fibers and bonding fibers acoustically couples the bulk layer with the composite.

Referring to FIG. 3, the adhesive layer 90 may be any suitable adhesive, including but not limited to a water-based adhesive, a solvent-based adhesive, and a heat or UV activated adhesive. The adhesive may be applied as a free standing film, a coating (continuous or discontinuous, random or patterned), a powder, or any other known means.

Referring back to FIG. 1, the facing layer 30 may be any suitable layer and material. In one embodiment, the facing layer is a knit textile, a woven textile, a non-woven textile, a film or a layer containing nano-fibers. The binder fibers 40 from the non-woven layer 20 are preferably intimately adhered to the facing layer (this means that the binder fibers 40 are adhered using the binding nature of the binding fibers 40 and that no additional adhesives are used). In another embodiment, there is an added adhesive attaching the facing layer 30 to the non-woven layer 20. The facing layers 30 may be the same in each acoustically coupled non-woven composite 10 or may vary from composite 10 to composite 10 within the acoustic composite 13. In one embodiment, the facing layer is calendared using heat and/or pressure. This serves to adjust the porosity of the facing layer to the desired amount. More than one facing layer may be used on a single side of the non-woven composite 10, and those multiple facing layers may be of the same construction or different construction. In one embodiment, a single facing layer can contain two or more layers which could be a combination of a meltblown non-woven layer and nano-fiber layer, for example.

In one embodiment, the facing layer is a film, preferably a thermoplastic film. The thermoplastic film in the non-woven composite 10 may be any suitable thermoplastic film. The thermoplastic film is preferably made up of a polyester or polyolefin such as polypropylene or polyethylene. In one embodiment, the thermoplastic film 30, the binder fibers 40, and the bulking fibers 50 are selected such that they are all the same class, for example each element (30, 40, 50) are polyester or each element (30, 40, 50) are polypropylene. This creates a non-woven composite 10 where all of the elements are comprised of the same polymeric material (e.g., polyester), so that the composite is more easily recyclable. In another embodiment, the thermoplastic film and the binder fiber polymers are selected such that, when melted, the polymer of the binder fibers 40 wets out the surface of the film 30. This improves the adhesion and acoustic coupling of the film 30 and the binder fibers 40.

In one embodiment, the thermoplastic film is air impermeable. In another embodiment, the thermoplastic film has some air permeability due to apertures including perforations, slits, or other types of holes in the film. The thermoplastic film can have any suitable thickness, density, or stiffness. Preferably, the thickness of the film is between less than 2 and 50 microns thick, more preferably the film has a thickness of between about 5 and 25 microns, more preferably between about 5 and 15 microns thick. In one embodiment, the film has a thickness of less than about 2 times the diameter of the binder fibers. In another embodiment, the film has a thickness of between about 0.5 and 1 times the diameter of the binder fiber. The film thickness and mechanical properties are chosen to absorb acoustic energy, while minimizing reflections of acoustic energy.

It has been found that when a thicker film 30 is used in the composite 10, the consolidation temperatures or time may need to be increased. In one embodiment, the thermoplastic film 30 may contain any suitable additives or coatings, such as an adhesion promoting coating.

The binder fibers 40 are adhered directly to the thermoplastic film 30. This means that the binder fibers 40 are intimately touching and attached to the film 30, without any additional fibers, fabrics, adhesives, coatings, or films between the binder fibers 40 and the film 30. It is believed that when one places a fibrous adhesive layer between the binder fibers 40 and the film 30 the acoustical coupling and resultant acoustical properties of the composite 10 may be reduced.

In another embodiment, the facing layer is a textile selected from the group consisting of a woven, knit, or non-woven. In one embodiment, the textile facing layer yarns and/or fibers contain thermoplastic polymer, cellulose, glass, ceramic, and mixtures thereof. The facing layers can be selected to maximize their acoustic performance. For example, the facing layer may have a target air permeability to enhance the sound absorption when coupled with the lofted nonwoven layer. Certain facings may also be desirable, such as a knit or woven, to achieve a desired aesthetic or pattern. Additionally, fibers and their construction may be selected to achieve mechanical strength, resistance to tearing and abrasion, or compatibility with fibers making up the nonwoven. Fibers and facing construction may also be selected to achieve fire retardant requirements. Also desirable are lightweight, lower cost facings which can be achieved with smaller fiber diameters such as a meltblown nonwovens or nanofiber nonwovens. In some cases combinations of these materials achieve a preferred facing layer.

In one embodiment, the facing layer 30 is a woven textile. The fabric base may also be, for example, plain, satin, twill, basket-weave, poplin, jacquard, and crepe weave textiles. Preferably, the woven textile is a plain weave textile. It has been shown that a plain weave textile has good abrasion and wear characteristics. A twill weave has been shown to have good properties for compound curves so may also be preferred for some textiles. The end count in the warp direction is between 35 and 70 in one embodiment. The denier of the warp yarns is between 350 and 1200 denier in one embodiment. In one embodiment, the textile is air permeable.

In another embodiment, the facing layer 30 is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the facing layer 30 is a multi-axial, such as a tri-axial fabric (knit, woven, or non-woven). In another embodiment, the textile is a bias fabric. In another embodiment, the facing layer 30 is a scrim.

In another embodiment, the facing layer 30 is a non-woven. The term non-woven refers to structures incorporating a mass of yarns that are entangled and/or heat fused so as to provide a coordinated structure with a degree of internal coherency. Non-woven fabrics for use as the textile may be formed from many processes such as for example, meltspun processes, hydroentangling processes, mechanically entangled processes, stitch-bonded and the like. In another embodiment, the textile is a unidirectional textile and may have overlapping yarns or may have gaps between the yarns. Preferably, when the facing layer 30 is a non-woven, the non-woven textile has a lower tenacity than the non-woven layer 20 of the acoustically coupled non-woven composite 10. In one embodiment, the facing layer 30 being a non-woven layer is a spunbond, a meltblown or a composite of the two (spunbond-meltblown-spunond).

The yarns or fibers making up the textile may be any suitable yarn. "Yarn" and "fiber", in this application, as used herein includes a monofilament elongated body, a multifilament elongated body, ribbon, strip, fiber, yarn, tape, and the like. The term yarn includes a plurality of any one or combination of the above. The yarns may be of any suitable form such as spun staple yarn, monofilament, or multifilament, single component, bi-component, or multi-component, and have any suitable cross-section shape such as circular, multilobal, square or rectangular (tape), and oval.

Some suitable materials for the yarns/fibers include polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof.

In one embodiment, the material forming the facing layer 30 (i.e. the yarns forming the textile), the binder fibers 40, and the bulking fibers 50 are selected such that they are all the same class, for example each element (30, 40, 50) are polyester or each element (30, 40, 50) are polypropylene. This creates a non-woven composite 10 where all of the elements are comprised of the same polymeric material (e.g., polyester), so that the composite is more easily recyclable.

In another embodiment, the facing layer 30 contains nanofibers. In one embodiment, the facing layer contains nanofibers and larger sized fibers, and in another embodiment, the facing layer 30 comprises nano-fibers almost completely. In one embodiment, the fibers in the facing layer have a median diameter of less than 1 micrometer. Due to the smaller fiber diameter of nanofibers, they more readily absorb acoustic energy at lighter weights. By creating a high surface area, tortuous network, acoustic energy can be attenuated by entrapped air in the nanofiber network.

The nanofibers of the nonwoven 200 may be made in any manner able to produce thermoplastic nanofibers. One method to produce suitable nanofibers is melt-film fibrillation. Melt-film fibrillation is a high throughput process that extrudes a film or film tube which is fibrillated into small fibers via a high velocity gas. Near the exit of the slot or nozzle, high velocity gas shears the film against the tube or slot wall and fibrillates the polymer. By tuning the polymer flow, gas velocities, and nozzle geometry, the process can be used to create uniform fibers with diameters down to less than 500 nanometers in diameter, or even less than about 300 nm.

Two technologies using fibrillation have been developed which both utilize a round coaxial nozzle concept. The first is nanofibers by gas jet disclosed in several patents (U.S. Pat. Nos. 6,382,526, 6,520,425, and 6,695,992 all of which are incorporated by reference). The first technology uses a coaxial design, which also can include multiple coaxial tubes to add a surrounding "lip-cleaning" air, as well as multiple film tubes and multiple air streams.

The second technology utilizes an array of nozzles using a melt-film fibrillation process, disclosed in several patents (U.S. Pat. Nos. 6,183,670 and 6,315,806 all of which are incorporated by reference). This technology uses round coaxial nozzles with a central air stream and an outer film tube. Molten polymer is fed into an array of these round nozzles with polymer melt and causing some nozzles to produce fine fiber (below 1 micron in median diameter) and some to produce larger fiber (greater than 1 micron in median diameter).

Additionally, there is a variation on the technologies that use a film or slot form (U.S. Pat. No. 6,695,992). Conceptually, the process is an opened or "infinite" version of the film tube. The molten polymer is fed through one or more slots and has fibrillating gas streams and "lip-cleaning" streams essentially parallel to the film slot. A film sheet can then be extruded through a slot with a gas stream shearing the film against the lip and fibrillating the sheet into fine fibers.

Several other processes exist for making thermoplastic fibers with diameters below 1 micron. These processes include several of interest for this invention, including "electro-spinning", "electro-blowing", "melt-blowing", "melt-film fibrillation", "nanofiber by gas jet", "melt fiber bursting", "spinning melt" and "bicomponent" fibers (e.g. islands-in-sea, segmented pie). While these processes all produce fibers with submicron diameters, various fiber parameters may be unique to a particular process, such as processible materials, maximum throughput, average diameter and distribution, and fiber length. The nanofibers produced may be further processed into yarns, ropes, tapes, knits, woven or nonwoven fabric constructions.

In one embodiment, the non-woven layer 20 contains a skin on at least the first surface 20a forms from an at least partially melt bond of the binder fibers 40 with at least a portion of the other fibers (other binder fibers 40, bulking fibers 50, or any other fiber in the non-woven layer 20). This "skin" may be very flexible, semi-rigid, or rigid. The skin may feel like a slightly stiffer surface to the non-woven or may have almost a film-like appearance. The non-woven layer 20 may also contain a second skin on second surface 20b of the non-woven layer 20, but to have a more rigid skin on the second surface, it may be advantageous to have additional binder fibers added to the non-woven layer 20 in a size such that they are located enough of a concentration at the second surface to melt and form a skin.

The non-woven layer 20 and the acoustically coupled non-woven composite 10 may be formed with any suitable equipment. A commercially available piece of equipment 200 that has been found satisfactory in this process to form the non-woven composite is the "K-12 HIGH-LOFT RANDOM CARD" by Fehrer AG, in Linz, Austria, shown in FIG. 4. To form the non-woven layer 20, the binder fibers 40 and the bulking fibers 50 (and any other fiber being used) are opened and blended in the appropriate proportions and enter an air chamber. The air chamber suspends the blended fibers in air, and the fibers expelled for delivery to an air lay machine that uses a cylinder 220. The cylinder 220 rotates and slings the blended fibers towards a collection belt 230. The spinning rotation of the cylinder 220 slings the heavier fibers a further distance along the collection belt 230 than it slings the lighter fibers. As a result, the mat of fibers collected on the collection belt 230 will have a greater concentration of the lighter fibers adjacent to the collection belt 230, and a greater concentration of the heavier fibers further away from the collection belt 230. In general, the larger the difference in denier between the fibers, the greater the gradient will be in the distribution of the fibers.

In the embodiment of the non-woven layer 20 illustrated in FIG. 1, the binder fibers 40 are lighter (a lower denier) than the bulking fibers 50. Therefore, in the process illustrated in FIG. 4, the binder fibers 40 collect in greater concentration near the collection belt 230, and the bulking fibers 50 collect in greater concentration away from the collection belt 230. It is this distribution by the equipment 300 that creates binder zone 21 and the bulking zone 23 of the non-woven layer 20.

Figure 4:
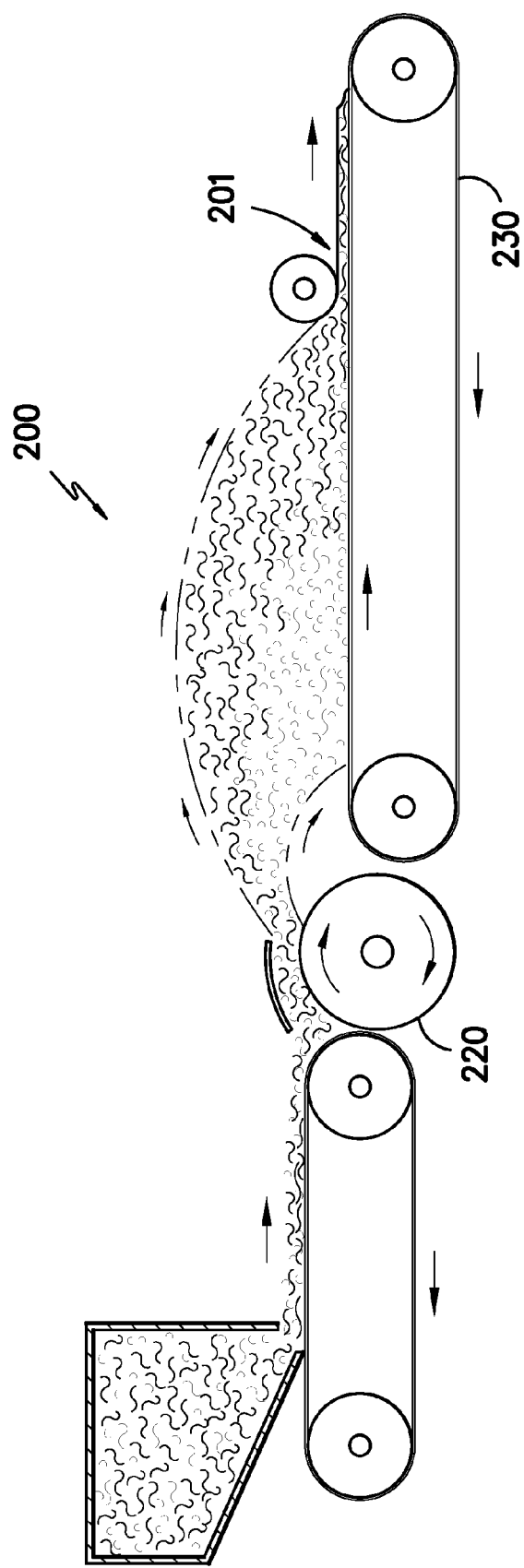
FIG. 4 shows a diagram of a piece of equipment for performing a process for forming one embodiment of the non-woven layer.

The non-woven layer collected at the end of the equipment 200 shown in FIG. 4 is an unconsolidated non-woven layer, meaning that the binder fibers 40 are not yet adhered to any other fiber or film. The non-woven layer 20 is then subjected to a heat treatment to consolidate the non-woven layer 20 and activate the binder fibers 40. This heat treatment may also be used to create skin layers on one or both surfaces 20a, 20b of the non-woven layer 20.

The skin of the non-woven layer 20 is typically formed after the non-woven layer 20 is formed. After the non-woven layer 20 is formed, it can be heated so that the binder fibers 40 at least partially melt and adhere to other binder fibers 40, bulking fibers 50, or other elements such as films or other fibers. This heating step stabilizes the non-woven layer 20 and can used to create the final product or can be used to stabilize the non-woven layer 20 for subsequent steps. In the embodiments of the non-woven layer 20 having at least a skin on the first surface of the non-woven layer, the first surface 20a of the non-woven layer 20 is subjected to a heat treatment, such as a calendar, a heated roller, or a heated belt, which causes the first binder fibers 40 at the first surface 20a to fuse together and with the other fibers in the first surface 20a to form a skin creating a non-woven layer 20 with reduced air permeability, improved sound absorption, increased abrasion resistance, and increased rigidity as compared to similar material without a fused skin. A heat treatment may be applied to the second surface 20b (instead of or in addition to the first surface 20a) to create a skin on the second surface 20b of the non-woven layer 20. If skins are desired on the first surface 20a and the second surface 20b, then pair of heated belts, such as a laminator, may be used to simultaneously heat the first surface 20a and the second surface 20b.

The facing layer 30 may be applied to the non-woven layer 20 by any suitable means. In one embodiment, the facing layer 30 is applied to the non-woven layer before the non-woven layer 20 is consolidated. Using heat and optionally pressure, the binder fibers 40 will at least partially melt and adhere to the other binder fibers 40 and bulking fibers 50 at least at the first surface 20a of the non-woven layer 20 (and preferably throughout the thickness of the non-woven layer 20). Preferably, the facing layer 30 is introduced to the non-woven layer before the non-woven layer is consolidated. For example, in FIG. 4, the facing layer 30 in one embodiment may be introduced into the system on the belt 230 with the non-woven layer forming on top of the facing layer 30, and then the composite can go through a heated treatment to consolidate the composite forming the acoustically coupled non-woven composite 10. During the consolidation step where the binder fibers adhere to the facing layer 30, the bulking fibers, and other binder fibers, there may be some shrinkage in the facing layer 30. In this instance, the resultant non-woven composite may not have a smooth surface on one side, but a wrinkled or bumpy surface.

In another embodiment, the facing layer 30 is applied to a non-woven layer that has already been partially or fully consolidated. The facing layer 30 may be placed on the non-woven layer and the composite would be consolidated again. In another embodiment, the facing layer 30 is extruded directly onto the non-woven layer. In this embodiment, it may be preferred for the non-woven layer 20 to have a skin at the first surface 20a to have a flatter surface for extrusion.

The non-woven composite 10 may also contain any additional layers for physical or aesthetic purposes. Suitable additional layers include, but are not limited to, a non-woven fabric, a woven fabric, a knitted fabric, a foam layer, a film, a paper layer, an adhesive-backed layer, a foil, a mesh, an elastic fabric (i.e., any of the above-described woven, knitted or non-woven fabrics having elastic properties), an apertured web, an adhesive-backed layer, or any combination thereof. Other suitable additional layers include, but are not limited to, a color-containing layer (e.g., a print layer); one or more additional sub-micron fiber layers having a distinct average fiber diameter and/or physical composition; one or more secondary fine fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof. The additional layers may be on either or both sides of the non-woven composite. For example, a textile may be applied to one side of the non-woven composite using an optional adhesive layer to form an aesthetic surface for an end use such as certain automobile applications.

The non-woven composite 10 may further comprise one or more attachment devices to enable the composite 10 to be attached to a substrate or other surface. In addition to adhesives, other attachment devices may be used such as mechanical fasteners like screws, nails, clips, staples, stitching, thread, hook and loop materials, etc.

The one or more attachment devices may be used to attach the composite 10 to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

Test Methods

The normal incidence sound absorption of the non-woven layer and non-woven composites were obtained according to the ASTM E1050 standards via impedance tube measurements with no air gap between the specimen and the back plate. The acoustical measurements were made using a two microphone Bruel and Kjaer (B&K) type 4206 A impedance measurement tube. Plane waves were generated in the tube by a broadband, stationary, random noise source powered by a B&K type 2716C power amplifier, and standing waves in the tube were measured at two fixed locations using calibrated microphones. By measuring the sound pressure at two fixed locations and calculating the complex transfer function using a two-channel digital frequency analyzer (B&K 3560C), the complex reflection coefficient, the sound absorption coefficient and the normal acoustic impedance of the non-woven layers and non-woven composites were obtained. The samples for the impedance tube measurements were die cut to 63.5 mm diameter to fit the medium impedance tube specifically designed to measure the sound absorption coefficient in the frequency range 100 Hz to 3200 Hz. The average of the absorption coefficient was calculated by averaging the sound absorption coefficient over all frequencies from 200 to 3000 Hz.

The Random Incidence Sound Absorption measurements were performed in a small reverberation room at an outside testing laboratory, Kolano and Saha Engineers, Inc. Measurements were made in a small reverberation room (25 m$^3$) where a standard for measurements is being worked on in the SAE standard committee. The test procedure followed for this measurement was generally in accordance with the standard test method of ASTM C423-09a, Sound Absorption and Sound Coefficients by the Reverberation Room Method, with some exceptions. To perform each test a 1 m by 1.2m sample was laid on the floor without any air space between the samples and the floor. The perimeter edges were covered by a metal frame such that the edges were not exposed to sound. In order to measure sound absorption, the sound decay rate is first measured in the empty room, and then repeated with the sample in the room. The magnitude of the difference in the decay rates provides a basis for calculating the sound absorption in Sabin provided by the sample alone. This quantity divided by the area of the test sample provides the absorption coefficient. Measurements were made with 12 microphone-source locations with five measurements each, giving 60 separate decay rate measurements. Each measurement set was performed over a one-third octave frequency band center from 250 Hz to 8000 Hz.

EXAMPLES

The invention will now be described with reference to the following non-limiting examples, in which all parts and percentages are by weight unless otherwise indicated.

Example 1

Example 1 was a unitary acoustically coupled non-woven composite. The non-woven layer was a stratified layer formed from a blend of two fibers:
1) 50% by weight of a bulking fiber being 40 denier (44.4 decitex) polyester
2) 50% by weight of a low melt binder fiber being 4 denier (4.4 decitex) denier core sheath polyester with a lower melting temperature sheath.

The fibers were opened, blended and formed into a stratified non-woven layer using a "K-12 HIGH-LOFT RANDOM CARD" by Fehrer AG (Linz, Austria). The above described fiber blend was air-laid onto a moving belt. Due to the difference in denier between the fibers contained in the fiber blend, the K-12 machine produces a functionally graded composite mat that contains a greater concentration of the 4 denier binder fiber on the side closest to the collection belt (forming the first surface of the non-woven) and a greater concentration of the 40 denier bulking fiber on the other side of the non-woven layer (forming the second surface of the non-woven layer). Following the air laying step, a 12.5 micron thick polyethylene terephthalate (PET) film was let off onto the first surface (belt side) of the non-woven layer. The resulting composite was passed through a through-air oven in which air heated to a temperature of approximately 175° C. (347° F.) to partially melt the binder fibers, bonding the binder fibers to the thermoplastic film, other binder fibers, and the bulking fibers. The differential shrinkage of the non-woven layer and the film induced some wrinkling in the film. The acoustically coupled non-woven composite had an areal density of 200 g/m$^2$ and was 16 mm thick.

Example 2

Example 2 was a unitary acoustically coupled non-woven composite forming using the same method described in Example 1 with the exception that different fiber types and percentages were used in the non-woven layer:
1) 60% by weight of a first bulking fiber being 40 denier (44.4 decitex) polyester
2) 40% by weight of a low melt binder fiber being 2 (denier (2.2 decitex) core sheath polyester with a lower melting temperature sheath.

The acoustically coupled composite had an areal density of 450 g/m$^2$ and a thickness of 30 mm.

Example 3

Example 3 was a non-woven layer formed according to Example 1 (same types of fibers and amounts), but no film was added. (The non-woven layer was still passed through the oven to bond the binder fibers to bulking fibers and other binder fibers.) The non-woven layer had an areal density of 180 g/m$^2$ and a thickness of 16 mm.

Example 4

Example 4 was a homogenous non-woven layer formed from a blend of three fibers:
1) 50% by weight of a first bulking fiber being 1.5 (1.7 decitex) denier polyester
2) 30% by weight of a second bulking fiber being 15 denier (16.7 decitex) polyester
3) 20% by weight of a low melt binder fiber being 4 denier (4.4 decitex) core sheath polyester with a lower melting temperature sheath.

The fibers were prepared with the addition of mixing bar to create a homogeneous non-woven layer having a homogenous distribution of fibers with essentially no stratification. No films were added to the non-woven layer. (The non-woven layer was still passed through the oven to bond the binder fibers to bulking fibers and other binder fibers.) The non-woven layer had an areal density of 490 g/m$^2$ and a thickness of 20 mm.

Example 5

A 12.5 micron thick PET film was let off onto the first surface (belt side) of the (homogeneous) non-woven layer formed in Example 4 following the air laying step. The resulting composite was passed through a through-air oven in which air heated to a temperature of approximately 175° C. (347° F.) to partially melt the binder fibers, bonding the binder fibers to the thermoplastic film, other binder fibers, and the bulking fibers. The differential shrinkage of the non-woven layer and the film induced some wrinkling in the film. The resultant non-woven composite had an areal density of 500 g/m$^2$ and a thickness of 20 mm.

Example 6

The non-woven composite of Example 6 was produced with the same procedure and materials as the acoustically coupled non-woven composite of Example 1, except with an added web adhesive layer between the non-woven layer and the film.

Following the air laying step, a 12.5 micron thick PET film and a web adhesive were let off onto the first side (belt side) of the non-woven layer of Example 1. The web adhesive layer was a 30 g/m² low melt adhesive layer which was sandwiched between the film and the first surface of the non-woven layer. The resultant non-woven composite had an areal density of 230 g/m² and a thickness of 16 mm.

Example 7

The non-woven composite of Example 7 was produced with the same procedure and materials as the acoustically coupled non-woven composite of Example 1, except that the film was added to the second surface of the non-woven layer and an added web adhesive layer between the non-woven layer and the film.

Following the air laying step, a 12.5 micron thick PET film and a web adhesive were let off onto the second surface (opposite the belt) of the non-woven layer. The web adhesive layer was a 30 g/m² low melt adhesive layer which was sandwiched between the film and the second surface of the non-woven layer. The non-woven composite had an areal density of 230 g/m² and a thickness of 16 mm.

Example 8

Example 8 was an acoustic composite containing a single acoustically coupled nonwoven composite having a nanofiber layer as a facing layer. The non-woven layer was a stratified layer formed from a blend of two fibers:
1) 60% by weight of a bulking fiber being 1.5 denier (1.67 decitex) polyester
2) 40% by weight of a low melt binder fiber being 4 denier (4.4 decitex) denier core sheath polyester with a lower melting temperature sheath.

The high-loft sample was prepared as in Example 1. In a separate process a nanofiber layer was formed with approximately 25 g/m² of polypropylene nanofibers deposited on a 14 g/m² polypropylene spunbond using a nanofiber by gas jet process. The resultant 40 g/m² facing layer contained both nanofibers on one side and larger spunbond fibers on the other side. The facing layer was laid on the second surface on the nonwoven. The facing layer had a Frazier air permeability of 35 cfm. The acoustically coupled non-woven composite had an areal density of 225 g/m² and was 23 mm thick.

Example 9

Example 9 was an acoustic composite containing a single acoustically coupled nonwoven composite having a meltblown layer as a facing layer. The non-woven layer was formed as in Example 8. Separately a meltblown nonwoven layer was obtained from Delstar Technologies, Inc, product number DP1001-40BNAT. The meltblown layer consisted of polybutylene terephthalate (PBT) fibers formed as a monolithic meltblown web of 40 g/m². The facing layer was laid on the second surface on the nonwoven. The facing layer had a Frazier air permeability of 70 cfm. The acoustically coupled non-woven composite had an areal density of 250 g/m² and was 27 mm thick.

Example 10

Example 10 was formed from laying Example 9 on top of Example 8, without any additional bonding and measured in a reverberation room for sound absorption for the combination of two acoustically coupled non-woven composites. The resultant acoustic composite has an areal density of 475 g/m² and was 50 mm thick.

Example 11

Example 11 was prepared identically to Example 8 but with a heavier high-loft nonwoven of the same blend. The acoustically coupled non-woven composite had an areal density of 490 g/m² and was 31 mm thick.

Example 12

Example 12 was prepared as in Example 8, however no facing layer was attached. High-loft nonwoven was 315 g/m² and was 21 mm thick.

Example 13

Example 13 was prepared as in Example 8, however no facing layer was attached. High-loft nonwoven was 450 g/m² and was 30 mm thick.

Results

TABLE 1

Thickness, areal density, and average absorption coefficient of Examples

| Example | Thickness (mm) | Areal Density (g/m²) | Average Absorption Coefficient |
|---|---|---|---|
| 1 | 16 | 200 | 0.712 |
| 2 | 30 | 450 | 0.819 |
| 3 | 16 | 180 | 0.087 |
| 4 | 20 | 490 | 0.175 |
| 5 | 20 | 500 | 0.268 |
| 6 | 16 | 230 | 0.646 |
| 7 | 16 | 230 | 0.414 |

Table 1 shows the average absorption coefficients of Examples 1-7. The average absorption coefficient was calculated from impedance tube measurements. The acoustically coupled non-woven composites of Examples 1 and 2 show increased sound absorption over the Examples 3-7. The Examples of 1 and 2 have as good or better acoustic performance at the same or lower weight as compared to the Examples 4-7.

The addition of a film bonded to the non-woven layer on the first surface of the non-woven layer to form the non-woven composite of Example 1 results in higher absorption as compared to only the non-woven layer of Example 3.

The stratification of the non-woven layers, where the non-woven layer contains a higher concentration of binder fibers at the first surface show an increase in sound absorption over homogenous non-woven layers as cab seen when comparing Examples 1 and 2 with Examples 4 and 5.

Introduction of a web adhesive as a separate layer to bond the thermoplastic film to the non-woven layer resulted in a decrease in sound absorption. In particular, in the non-woven composites of Examples 6 and 7, the increase in sound absorption was lower and did not increase over as wide a frequency band as compared to Examples 1 and 2, resulting in a lower average sound absorption coefficient. The results indicate an importance in the nature of the bonding between the film and the non-woven layer to produce acoustic coupling for broad frequency increase in sound absorption.

Figure 5:
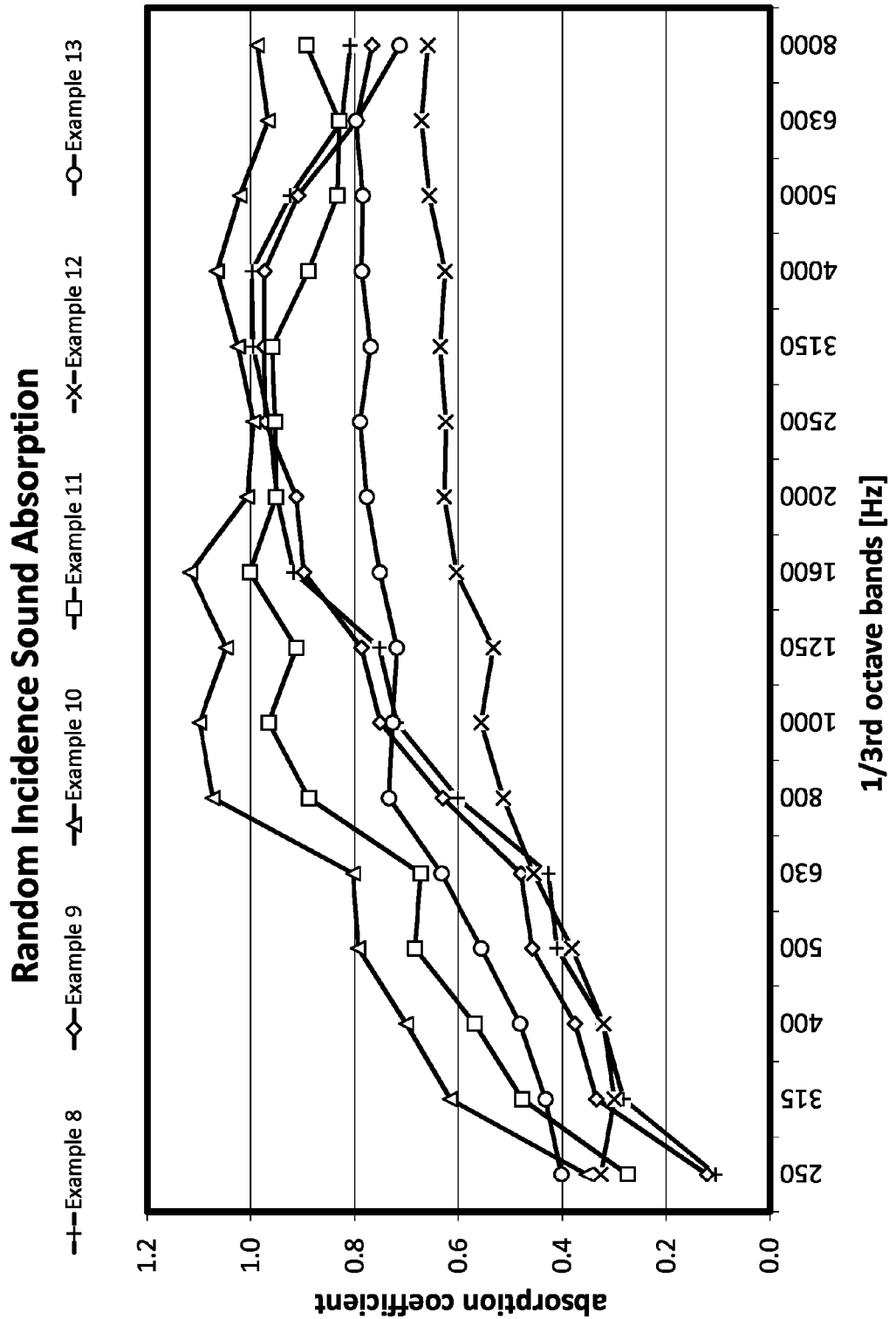
FIG. 5 is a graph showing the acoustic absorption over a frequency range from 250 to 8000 Hz.

FIG. 5 shows the acoustic absorption over a frequency range from 250 to 8000 Hz for Example 8-13. The data was measured using random incidence sound absorption measurements made in a small reverberation room (25 m$^3$); test procedure followed for this measurement was generally in accordance with the standard test method of ASTM C423-09a. The addition of an acoustic composite layer improves the sound absorption over a broad frequency range versus the nonwoven layer by itself (compare Examples 8 and 9 to Example 12 and compare Example 11 to Example 13). Furthermore, layering two acoustically coupled nonwoven composites, as in Example 10, has a higher absorption coefficient over a broader frequency range versus a similar weight single layer acoustic composite, as in Example 13.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An acoustic composite comprising:
   at least a first acoustically coupled non-woven composite and a second acoustically coupled non-woven composite, wherein each acoustically coupled non-woven composite comprises:
   a non-woven layer having a first surface and a second surface, wherein the non-woven layer comprises a plurality of binder fibers and a plurality of bulking fibers, wherein the non-woven layer comprises:
   a binder zone extending from a binder outer boundary to a binder inner boundary, wherein the binder outer boundary forms the first surface of the non-woven layer, wherein the binder zone contains a portion of both the bulking fibers and the binder fibers with a higher portion of binder fibers than bulking fibers, wherein the concentration of binder fibers is greater near the binder outer boundary than at the binder inner boundary, wherein a majority of the binder fibers in the binder zone are oriented approximately parallel to the binder outer boundary, wherein at least a portion of the binder fibers are adhered to the bulking fibers, and wherein at least a portion of the binder fibers are adhered to the other binder fibers,
   a bulking zone extending from a bulking zone outer boundary to a bulking zone inner boundary adjacent to the binder inner boundary, wherein the bulking zone outer boundary forms the second surface of the non-woven layer, wherein the bulking zone contains a portion of both bulking fibers and the binder fibers with a higher portion of bulking fibers, wherein the concentration of bulking fibers is greater near the bulking zone outer boundary than at the bulking zone inner boundary, wherein a majority of the bulking fibers have a tangential angle of between about 25 and 90 degrees to the normal of the bulking outer boundary measured at the midpoint between the bulking outer boundary and bulking inner boundary, and wherein at least a portion of the bulking fibers are adhered to the binder fibers; and,
   a facing layer selected from the group consisting of a woven, non-woven, knit, film, or nano-fiber layer adhered to the first surface of the non-woven layer through the binder fibers, wherein the binder fibers are intimately adhered to the facing layer,
   wherein the facing layer of the second acoustically coupled non-woven composite is adjacent the second surface of the non-woven layer of the first acoustically coupled non-woven composite.

2. The acoustic composite of claim 1, further comprising a third acoustically coupled non-woven composite, the third acoustically coupled non-woven composite comprising:
   a non-woven layer having a first surface and a second surface, wherein the non-woven layer comprises a plurality of binder fibers and a plurality of bulking fibers, wherein the non-woven layer comprises:
   a binder zone extending from a binder outer boundary to a binder inner boundary, wherein the binder outer boundary forms the first surface of the non-woven layer, wherein the binder zone contains a portion of both the bulking fibers and the binder fibers with a higher portion of binder fibers than bulking fibers, wherein the concentration of binder fibers is greater near the binder outer boundary than at the binder inner boundary, wherein a majority of the binder fibers in the binder zone are oriented approximately parallel to the binder outer boundary, wherein at least a portion of the binder fibers are adhered to the bulking fibers, and wherein at least a portion of the binder fibers are adhered to the other binder fibers,
   a bulking zone extending from a bulking zone outer boundary to a bulking zone inner boundary adjacent to the binder inner boundary, wherein the bulking zone outer boundary forms the second surface of the non-woven layer, wherein the bulking zone contains a portion of both bulking fibers and the binder fibers with a higher portion of bulking fibers, wherein the concentration of bulking fibers is greater near the bulking zone outer boundary than at the bulking zone inner boundary, wherein a majority of the bulking fibers have a tangential angle of between about 25 and 90 degrees to the normal of the bulking outer boundary measured at the midpoint between the bulking outer boundary and bulking inner boundary, and wherein at least a portion of the bulking fibers are adhered to the binder fibers; and, a facing layer selected from the group consisting of a woven, non-woven, knit, film, or nano-fiber layer adhered to the first surface of the non-woven layer through the binder fibers, wherein the binder fibers are intimately adhered to the facing layer, wherein the facing layer of the third acoustically coupled non-woven composite is adjacent the second surface of the non-woven layer of the second acoustically coupled non-woven composite.

3. The acoustic composite of claim 1, wherein at least one of the facing layers comprises a non-woven, wherein the facing non-woven has a lower tenacity than the non-woven layer of the respective non-woven layer of the acoustically coupled non-woven composite.

4. The acoustic composite of claim 1, wherein at least one of the facing layers comprises a nano-fiber layer, wherein the nano-fiber layer comprises fibers having a median diameter of less than about 1 micrometer.

5. The acoustic composite of claim 1, wherein at least one of the facing layers comprises a film, wherein the thickness of the film is between about 0.5 and 1 times the diameter of the binder fibers.

6. The acoustic composite of claim 1, wherein the binder zone comprises a first skin at the binder outer boundary, the first skin comprising the first binder fibers.

7. The acoustic composite of claim 1, wherein the facing layer of the second acoustically coupled non-woven composite is adhered to the second surface of the non-woven layer of the first acoustically coupled non-woven composite with an adhesive.

8. The acoustic composite of claim 1, wherein the facing layer of the second acoustically coupled non-woven composite is adhered to the second surface of the non-woven layer of the first acoustically coupled non-woven composite through the binder fibers.

9. The acoustic composite of claim 1, wherein the binder fibers, the bulking fibers, and the facing layer are all the same class of polymer.

10. The acoustic composite of claim 1, wherein each non-woven layer further comprises a plurality of second binder fibers.

11. The acoustic composite of claim 1, wherein each non-woven layer further comprises a plurality of effect fibers.

12. The acoustic composite of claim 1, wherein the non-woven composite is attached to a substrate, the substrate selected from the group consisting of a wall of a building, a ceiling of a building, a building material for forming a wall or ceiling of a building, a metal sheet, a glass substrate, a door, a window, a vehicle component, a machinery component, and an appliance component.

13. The acoustic composite of claim 1, wherein the facing layer comprises fibers selected from the group consisting of thermoplastic polymers, cellulose, glass, ceramic, and mixtures thereof.

14. A method of absorbing sound in an area, said method comprising the steps of surrounding at least a portion of the area with an acoustic composite comprising:

at least a first acoustically coupled non-woven composite and a second acoustically coupled non-woven composite, wherein each acoustically coupled non-woven composite comprises:

a non-woven layer having a first surface and a second surface, wherein the non-woven layer comprises a plurality of binder fibers and a plurality of bulking fibers, wherein the non-woven layer comprises:

a binder zone extending from a binder outer boundary to a binder inner boundary, wherein the binder outer boundary forms the first surface of the non-woven layer, wherein the binder zone contains a portion of both the bulking fibers and the binder fibers with a higher portion of binder fibers than bulking fibers, wherein the concentration of binder fibers is greater near the binder outer boundary than at the binder inner boundary, wherein a majority of the binder fibers in the binder zone are oriented approximately parallel to the binder outer boundary, wherein at least a portion of the binder fibers are adhered to the bulking fibers, and wherein at least a portion of the binder fibers are adhered to the other binder fibers, a bulking zone extending from a bulking zone outer boundary to a bulking zone inner boundary adjacent to the binder inner boundary, wherein the bulking zone outer boundary forms the second surface of the non-woven layer, wherein the bulking zone contains a portion of both bulking fibers and the binder fibers with a higher portion of bulking fibers, wherein the concentration of bulking fibers is greater near the bulking zone outer boundary than at the bulking zone inner boundary, wherein a majority of the bulking fibers have a tangential angle of between about 25 and 90 degrees to the normal of the bulking outer boundary measured at the midpoint between the bulking outer boundary and bulking inner boundary, and wherein at least a portion of the bulking fibers are adhered to the binder fibers; and, a facing layer selected from the group consisting of a woven, non-woven, knit, film, or nano-fiber layer adhered to the first surface of the non-woven layer through the binder fibers, wherein the binder fibers are intimately adhered to the facing layer, wherein the facing layer of the second acoustically coupled non-woven composite is adjacent the second surface of the non-woven layer of the first acoustically coupled non-woven composite.

15. The method of claim 14, wherein the area comprises an interior of a room; an interior of a vehicle; a piece of machinery; an appliance; a separate sound reduced area of an office or industrial area; a sound recording or reproduction area, an interior of a theatre or concert hall; an anechoic, analytical or experimental room or chamber where sound would be detrimental; earmuffs or ear covering for isolating protecting ears from noise.

16. The method of claim 14, wherein at least one of the facing layers comprises a non-woven, wherein the facing non-woven has a lower tenacity than the non-woven layer of the respective non-woven layer of the acoustically coupled non-woven composite.

17. The method of claim 14, wherein at least one of the facing layers comprises a nano-fiber layer, wherein the nano-fiber layer comprises fibers having a median diameter of less than about 1 micrometer.

18. The method of claim 14, wherein at least one of the facing layers comprises a film, wherein the thickness of the film is between about 0.5 and 1 times the diameter of the binder fibers.

19. The method of claim 14, wherein the binder zone comprises a first skin at the binder outer boundary, the first skin comprising the first binder fibers.

20. The method of claim 14, wherein the facing layer of the second acoustically coupled non-woven composite is adhered to the second surface of the non-woven layer of the first acoustically coupled non-woven composite with an adhesive.

* * * * *